(12) United States Patent
Cloyd et al.

(10) Patent No.: US 11,268,409 B2
(45) Date of Patent: Mar. 8, 2022

(54) OVER-POWERING

(71) Applicants: Mitsubishi Power Americas, Inc., Lake Mary, FL (US); Mitsubishi Power, Ltd., Yokohama (JP)

(72) Inventors: Scott Cloyd, Howey-in-the-Hills, FL (US); Jiro Asakuno, Hyogo-ken (JP); Toshihiko Toyota, Hyogo-ken (JP); Masaru Takamatsu, Hyogo-ken (JP); Michael Ducker, Gibsonia, PA (US); David Hunt, DeLand, FL (US)

(73) Assignees: Mitsubishi Power Americas, Inc., Lake Mary, FL (US); Mitsubishi Power, Ltd., Yokohama (JP)

( * ) Notice: Subject to any disclaimer, the term of this patent is extended or adjusted under 35 U.S.C. 154(b) by 120 days.

(21) Appl. No.: 16/631,127

(22) PCT Filed: Nov. 7, 2018

(86) PCT No.: PCT/US2018/059603
§ 371 (c)(1),
(2) Date: Jan. 14, 2020

(87) PCT Pub. No.: WO2019/094453
PCT Pub. Date: May 16, 2019

(65) Prior Publication Data
US 2020/0263569 A1 Aug. 20, 2020

Related U.S. Application Data

(60) Provisional application No. 62/625,113, filed on Feb. 1, 2018, provisional application No. 62/583,695, filed on Nov. 9, 2017.

(51) Int. Cl.
*F01K 23/10* (2006.01)
*F02C 6/18* (2006.01)
(Continued)

(52) U.S. Cl.
CPC .............. *F01K 23/101* (2013.01); *F02C 6/18* (2013.01); *F01K 7/16* (2013.01); *F01K 13/02* (2013.01);
(Continued)

(58) Field of Classification Search
CPC ... F02C 6/18; F01K 7/16; F01K 13/02; F05D 2220/31; F05D 2220/72; F05D 2220/76;
(Continued)

(56) References Cited

U.S. PATENT DOCUMENTS 4,437,313 A 3/1984 Taber et al.
4,821,507 A 4/1989 Bachmann et al.
(Continued)

FOREIGN PATENT DOCUMENTS

CN 111868354 10/2020
IN 202017020953 8/2020
(Continued)

OTHER PUBLICATIONS

"International Application Serial No. PCT US2018 059603, International Preliminary Report on Patentability dated May 22, 2020", 15 pgs.
(Continued)

*Primary Examiner* — Shafiq Mian
(74) *Attorney, Agent, or Firm* — Schwegman Lundberg & Woessner, P.A.

(57) ABSTRACT

A power plant system can comprise a first gas turbine having a first efficiency to produce a first exhaust flow, a first electrical generator driven by the first gas turbine, a first heat recovery steam generator to receive the first exhaust flow and generate a first steam flow, a second gas turbine having a second efficiency less than the first efficiency to produce a second exhaust flow, a second electrical generator driven by the second gas turbine, and an exhaust gas conditioning
(Continued)

device to reduce temperature of the second exhaust flow, a steam turbine driving a steam electrical generator to receive the first steam flow. The second gas turbine can be selectively operated to generate electricity with the second electrical generator under peak loading conditions when a sum of output from the steam electrical generator and the first electrical generator are less than an electrical demand from a grid.

19 Claims, 7 Drawing Sheets

(51) Int. Cl.
| F01K 7/16 | (2006.01) |
| F01K 13/02 | (2006.01) |
| F22B 1/18 | (2006.01) |

(52) U.S. Cl.
CPC ...... *F05D 2220/31* (2013.01); *F05D 2220/72* (2013.01); *F05D 2220/76* (2013.01); *F05D 2260/2322* (2013.01); *F05D 2270/303* (2013.01); *F22B 1/1815* (2013.01)

(58) Field of Classification Search
CPC ....... F05D 2260/2322; F05D 2270/303; F22B 1/1815
See application file for complete search history.

(56) References Cited

U.S. PATENT DOCUMENTS

| 5,299,601 | A | 4/1994 | Koch |
| 5,609,019 | A | 3/1997 | Nielsen |
| 5,649,416 | A | 7/1997 | Moore |
| 6,050,084 | A | 4/2000 | Schuetz et al. |
| 6,125,623 | A | 10/2000 | Cloyd et al. |
| 6,608,395 | B1 | 8/2003 | Steinway |
| 6,748,734 | B1 | 6/2004 | Coleman et al. |
| 6,851,514 | B2 | 2/2005 | Han et al. |
| 7,069,716 | B1 | 7/2006 | Childers |
| 7,089,727 | B2 | 8/2006 | Schuetz |
| 7,107,774 | B2 | 9/2006 | Radovich |
| 7,191,598 | B2 | 3/2007 | Coleman |
| 7,555,890 | B2 | 7/2009 | Kurihara et al. |
| 7,976,800 | B1 | 7/2011 | Buzanowski et al. |
| 8,061,002 | B2 | 11/2011 | Briesch et al. |
| 8,146,366 | B2 | 4/2012 | Oomens et al. |
| 8,186,152 | B2 | 5/2012 | Zhang et al. |
| 8,516,786 | B2 | 8/2013 | Zhang et al. |
| 8,516,787 | B2 | 8/2013 | Oomens et al. |
| 9,550,261 | B2 | 1/2017 | Brunhuber et al. |
| 2005/0034445 | A1* | 2/2005 | Radovich ................ F01K 23/10 60/39.182 |
| 2005/0172639 | A1 | 8/2005 | Yamanaka et al. |
| 2007/0130952 | A1 | 6/2007 | Copen |
| 2010/0077722 | A1* | 4/2010 | Sengar ................ F01K 23/106 60/39.182 |
| 2010/0175366 | A1 | 7/2010 | Nattanmai et al. |
| 2010/0180567 | A1 | 7/2010 | Nattanmai et al. |
| 2010/0257837 | A1 | 10/2010 | Schroder et al. |
| 2011/0138771 | A1 | 6/2011 | Feller et al. |
| 2013/0082467 | A1 | 4/2013 | Olia et al. |
| 2015/0020529 | A1 | 1/2015 | Hoskin et al. |
| 2015/0020530 | A1 | 1/2015 | Pandey et al. |
| 2015/0052906 | A1 | 2/2015 | Kehmna et al. |
| 2017/0058742 | A1 | 3/2017 | Zhang et al. |
| 2017/0182442 | A1 | 6/2017 | Kippel |
| 2017/0204771 | A1 | 7/2017 | Zhang et al. |
| 2017/0204786 | A1 | 7/2017 | Zhang et al. |
| 2017/0252698 | A1 | 9/2017 | Zhang et al. |
| 2017/0254222 | A1 | 9/2017 | Zhang et al. |
| 2017/0292424 | A1 | 10/2017 | Kippel et al. |
| 2017/0356319 | A1 | 12/2017 | Zhang |
| 2018/0066586 | A1 | 3/2018 | Brostmeyer et al. |

FOREIGN PATENT DOCUMENTS

| JP | S50101703 | | 8/1975 |
| JP | H09243079 | | 9/1997 |
| JP | H10132278 | | 5/1998 |
| JP | 2010084765 | | 4/2010 |
| KR | 100928206 | B1 | 11/2009 |
| TW | 201923213 | A | 6/2019 |
| WO | 9817951 | | 4/1998 |
| WO | WO-2012040790 | A1 | 4/2012 |
| WO | WO-2018021823 | A1 | 2/2018 |
| WO | WO-2019094453 | A1 | 5/2019 |

OTHER PUBLICATIONS

"Indian Application Serial No. 202017020953, First Examination Report dated Apr. 12, 2021", w English Translation, 5 pgs.
"Japanese Application Serial No. 2020-544582, Notification of Reasons for Refusal dated May 10, 2021", w English Translation, 12 pgs.
"International Application Serial No. PCT/US2018/059603, International Search Report dated Feb. 26, 2019", 3 pgs.
"International Application Serial No. PCT/US2018/059603, Written Opinion dated Feb. 26, 2019", 13 pgs.
"Japanese Application Serial No. 2020-544582, Response filed Aug. 10, 2021 to Notification of Reasons for Refusal dated May 10, 2021", w English Claims, 17 pgs.

\* cited by examiner

OVER-POWERING

PRIORITY APPLICATIONS

This application is a U.S. National Stage Filing under 35 U.S.C. 371 from International Patent Application Serial No. PCT/US2018/059603, filed Nov. 7, 2018, published on May 16, 2019 as WO 2019/094453, which application claims the benefit of priority to both U.S. Provisional Application Ser. No. 62/583,695, filed Nov. 9, 2017 and U.S. Provisional Application Ser. No. 62/625,113, filed Feb. 1, 2018, the contents of which are incorporated herein by reference in their entireties.

TECHNICAL FIELD

The present disclosure relates generally to power plants, such as combined cycle power plants. More particularly, the present disclosure relates to systems and methods for providing additional power to combined cycle power plants for back-up, peaking and other operations.

BACKGROUND

Combined cycle power plants can employ a gas turbine system and a steam turbine system to generate power. Typically, output of the gas turbine system is used to determine the capacity of the steam system. Combined cycle power plants can additionally be operated with dual-fuel capabilities, such as liquid fuel and natural gas, to offer operational flexibility and emergency response. Typically, normal operation is natural gas, with liquid fuel reserved for, typically emergency, conditions when natural gas is otherwise unavailable.

Grid system operators and government agencies have the ability to select operation of specific power plants among a variety of available power plants to meet grid demand at any point in time. Priority is typically given to more efficient units, which are often associated with newer power plants, for environmental and other reasons. This is often known as "dispatch."

In order to increase power plant uptime, or dispatch, and yield more economic and more efficient power generation capability, it is common for plant owners to replace older Gas Turbine Engines (GTEs) and accompanying Heat Recovery Steam Generators (HRSGs) with newer, more efficient models, such as with Advanced Gas Turbine Engines (AGTEs). For example, Advanced Gas Turbine Engines can operate at higher temperatures levels to more efficiently convert fuel to mechanical power for operating electrical generators. This can provide reduced emissions and economic benefits due to lower fuel consumption. Upgrading of facilities to replace one or more older GTEs and HRSGs with newer AGTEs and appropriately sized HRSGs can be referred to as repowering. This often results in older GTEs and HRSGs being scrapped, sold for use elsewhere or recycled into raw materials.

Examples of combined cycle power plants are described in U.S. Pat. No. 4,222,229 to Uram; U.S. Pat. No. 8,061,002 to Briesch et al.; U.S. Pub. No. 2016/0341076 to Kameno et al.; and International Pub. No. WO 2012/040790 to Jonker et al.

Overview

The present inventors have recognized, among other things, that a problem to be solved can include increasing the efficiency of an existing combined cycle power plant while maintaining low installation costs. Repowering of steam turbines has involved the replacement of existing steam generation equipment with new gas turbine engines (GTEs) and heat recovery steam generators (HRSGs) to match the existing steam turbine capabilities. This can result in high costs for purchasing and installing new equipment and having to dispose of old equipment. Furthermore, if the older models are dual-fuel to provide operational flexibility, the new replacement units are, at an additional cost and complexity, typically configured to be dual-fuel models.

The present inventors have recognized that often a single, newer, larger capacity AGTE unit, such as a J-Class GTE, has the capability, capacity or output sufficient to replace more than one older lower capacity units, such as F-Class GTEs. Additionally, the present inventors have recognized a possible loss of generating capacity resulting from replacement of multiple smaller capacity units with a single larger capacity unit during times when the larger capacity unit must be shut down for service or repair.

The present subject matter can help provide a solution to these and other problems, such as by providing overpowering concepts, where an AGTE and a HRSG with increased power, improved emission rates and heat rate benefits over previously installed units can be added to a power plant while retaining backup capacity value from the already installed and functioning GTEs and HRSGs. The present inventors have recognized that, instead of replacing existing steam generating units, e.g., GTEs and HRSGs, those steam generating units can be retained to provide capacity backup for times when the advanced class GTEs are not available due to maintenance or unplanned outage and increase plant availability.

The present subject matter can help provide a solution to these and other problems, such as by providing peaking concepts where an AGTE and a HRSG with increased power and heat rate benefits over previously installed units can be added to a power plant while using the already installed and functioning GTEs to use additional, remaining Steam Turbine (ST) capacity. The present inventors have referred to this concept of repowering an existing combined cycle power plant by integrating a new AGTE with the existing ST and continuing to utilize the existing GTE's in these novel ways as "OverPower."

The present inventors have recognized that because advanced class gas turbines have nearly doubled in output and increased efficiency while keeping exhaust gas temperatures in the 1100° F. (~593° C.) to 1200° F. (~649° C.) range, the steam cycles of F-Class GTEs can be efficiently re-utilized to move net plant efficiencies from the 55% range to over 61%.

In an example, a method of operating a power plant can comprise operating a higher efficiency or higher output gas turbine engine to drive an electrical generator for generating electrical power, generating steam with exhaust gas of the higher efficiency gas turbine engine using a heat recovery steam generator, driving a steam turbine with steam from the heat recovery steam generator, wherein the steam turbine has a capacity greater than an output of steam generated by the heat recovery steam generator as driven by the higher efficiency gas turbine engine, driving a steam electric generator from the steam turbine, in response to a sum of output from the steam electric generator and the electrical generator being less than an electrical demand from a grid, selectively operating one or more lower efficiency gas turbine engines to drive one or more electrical generators for generating electrical power, the lower efficiency gas turbine engines being less efficient than the higher efficiency gas turbine, and conditioning exhaust gas of the one or more lower efficiency gas turbine engines using one or more modified heat recovery steam generators.

In another example, a power plant system can comprise a first gas turbine having a first efficiency, the first gas turbine configured to produce a first exhaust gas flow, a first electrical generator driven by the first gas turbine, a first heat recovery steam generator configured to receive the first exhaust gas flow and generate a first steam flow, a second gas turbine having a second efficiency less than the first efficiency, the second gas turbine configured to produce a second exhaust gas flow, a second electrical generator driven by the second gas turbine, an exhaust gas conditioning device configured to reduce the temperature of the second exhaust gas flow, a steam turbine driving a steam electrical generator, the steam turbine configured to receive the first steam flow, and a controller comprising a processor, and a computer readable storage medium having stored thereon instructions that when executed by the processor cause the processor to perform an operation for operating the power plant system, the instructions comprising s in response to a sum of output from the steam electrical generator and the first electrical generator being less than an electrical demand from a grid, operating the second gas turbine to generate electricity with the second electrical generator under peak loading conditions.

In yet another example, a method of upgrading a power plant including a first gas turbine, a first heat recovery steam generator and a steam turbine located at a first facility can comprise installing at the first facility a second gas turbine having an efficiency greater than that of the first gas turbine, installing at the first facility a second heat recovery steam generator to receive exhaust gas from the second gas turbine, coupling the second heat recovery steam generator to the steam turbine, and modifying the first heat recovery steam generator to condition exhaust gas from the first gas turbine.

This overview is intended to provide an overview of subject matter of the present patent application. It is not intended to provide an exclusive or exhaustive explanation of the invention. The detailed description is included to provide further information about the present patent application.

Figure 1:
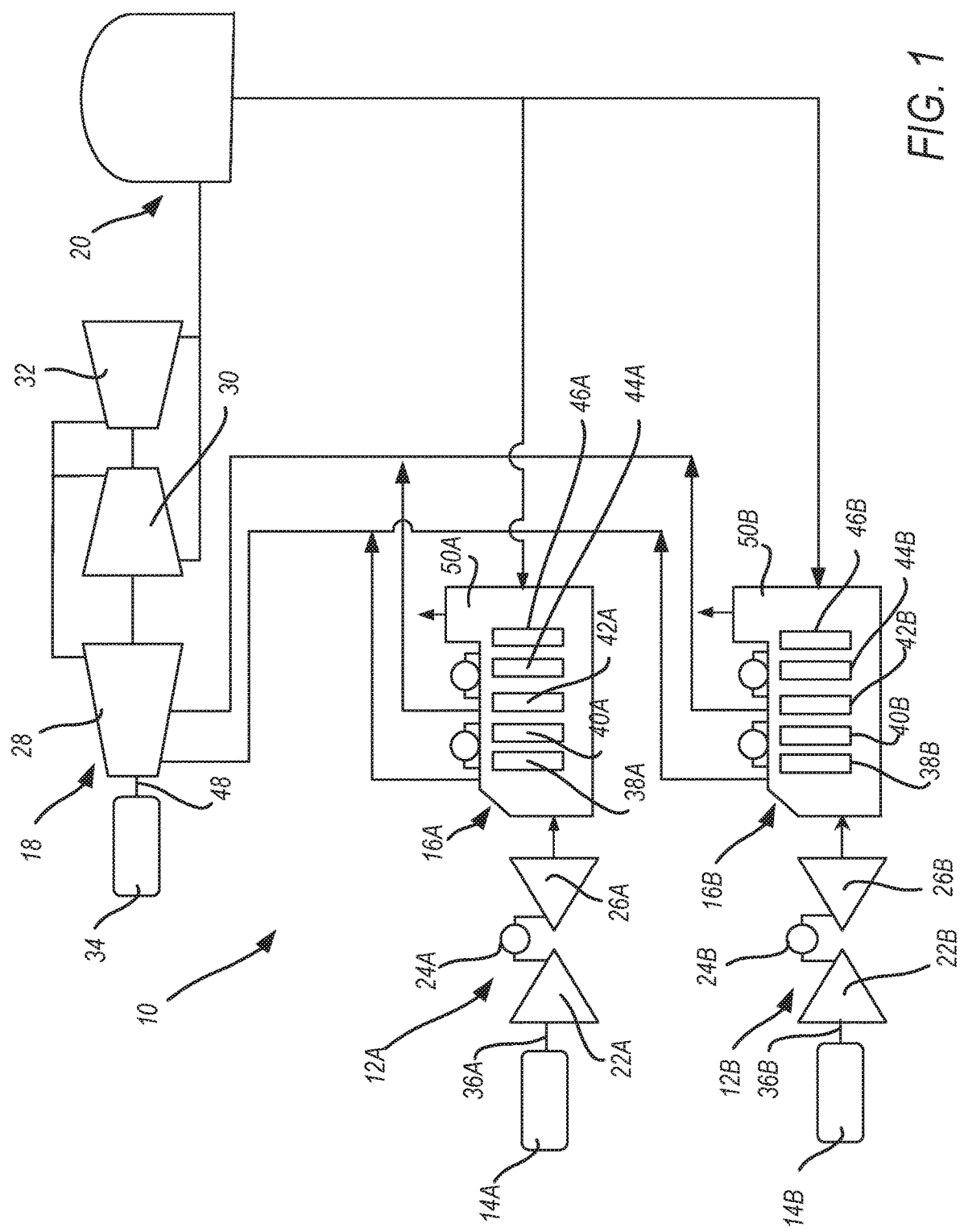
FIG. 1 is a schematic diagram of a conventional combined cycle power plant including a pair of gas turbines engines, a pair of heat recovery steam generators and a steam turbine.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

FIG. 1 is a schematic diagram of combined cycle power plant 10 including first gas turbine engine (GTE) 12A, first electric generator 14A, first heat recovery steam generator (HRSG) 16A, second gas turbine engine 12B, second electric generator 14B, second heat recovery steam generator 16A, steam system 18 and condenser 20. First GTE 12A can include compressor 22A, combustor 24A and turbine 26A. Second GTE 12B can include compressor 22B, combustor 24B and turbine 26B. Steam system 18 can include first stage turbine 28, second stage turbine 30, third stage turbine 32 and electric generator 34.

Each of GTE 12A and GTE 12B can be configured to operate by compressing air in compressors 22A and 22B, mixing the compressed air with fuel in combustors 24A and 24B to generate high energy gases, and then expanding the high energy gases in turbines 26A and 26B to produce rotational shaft power. Rotation of turbines 26A and 26B can rotate a shaft to propagate rotation of compressor 22A and 22B and compression of air therein to maintain the combustion process. That same rotational shaft power can be used to turn generator shafts 36A and 36B to provide input to electric generators 14A and 14B, respectively. Thus, combustion of fuel in combustors 24A and 24B is converted to electricity at electric generators 14A and 14B.

Gas expanded by turbines 26A and 26B can be passed into HRSGs 16A and 16B, respectively, to, for example, generate steam for operation of steam system 18. HRSG 16A can include duct burner 38A, superheater 40A, evaporator 42A, economizer 44A and selective catalytic reduction (SCR) system 46A. HRSG 16B can include duct burner 38B, superheater 40B, evaporator 42B, economizer 44B and selective catalytic reduction (SCR) system 46B. HRSGs 16A and 16B can include other components, such as CO catalyst systems and high and low pressure evaporators and economizers. The exhaust gas from turbines 26A and 26B can pass through the various components of HRSGs 16A and 16B to produce steam and ultimately cause rotation of turbines 28-32 to, for example, generate rotation of shaft 48 for providing input to electrical generator 34. Condenser 20 can collect steam from steam system 18 and return water condensed therefrom to HRSGs 16A and 16B to propagate the steam generation process. Steam system 18 and condenser 20 can operate in a conventional manner. Thus, generation of heat from exhaust gas of combustors 24A and 24B can be converted to electricity at electric generator 34.

Thus, gas turbine engines 12A and 12B can be configured to burn fuel to produce exhaust gas to rotate shafts 36A and 36B to produce electricity, with the exhaust gas being further used to heat water and steam within HRSGs 16A and 16B for further electricity production, before being discharged to the atmosphere at exhaust stacks 50A and 50B, respectively.

Increasing the efficiency of and reducing the emissions generated by power plant 10 can be achieved by replacing gas turbine engines 12A and 12B with relatively newer gas turbine engine systems, such as J-Class AGTEs, that are, for example, more efficient in converting fuel to rotational energy, thereby requiring less fuel and generating less emissions. Often, replacing each of GTEs 12A and 12B results in HRSGs 16A and 16B being replaced because the capacities of HRSGs 16A and 16B are sized to the capacities of GTEs 12A and 12B. As such, upgrading power plant 10 can involve replacing much or all of power plant 10 if steam system 18 and condenser 20 are replaced as well.

In the present disclosure, newer, more efficient equipment, which can function in place of GTEs 12A and 12B and HRSGs 16A and 16B during normal operations, can be added to power plant 10 for use with steam system 18 and condenser 20. GTEs 12A and 12B and HRSGs 16A and 16B can be coupled to the newer, more efficient equipment, using appropriate isolation valving, for use as backup or overpowering systems and to reduce the operational impact of the installation of the new equipment. Furthermore, GTEs 12A and 12B and HRSGs 16A and 16B can continue operation while much of the construction and installation of the new equipment is installed. Such a configuration is discussed with reference to FIG. 2. In other configurations, GTEs 12A and 12B and HRSGs 16A and 16B can be configured for peaking operations, such as is discussed with reference to FIGS. 3-7. In additional configurations, the newer, more efficient equipment can be configured to operate during peaking operations while GTEs 12A and 12B and HRSGs 16A and 16B operate as normal, such as is discussed with reference to FIG. 8. In other examples of the present disclosure, lower output gas turbine engines can be replaced, or supplemented with, higher output gas turbine engines, whether newer or not. Likewise, more efficient gas turbine engines need not necessarily be newer than the less efficient gas turbine engines.

Figure 2:
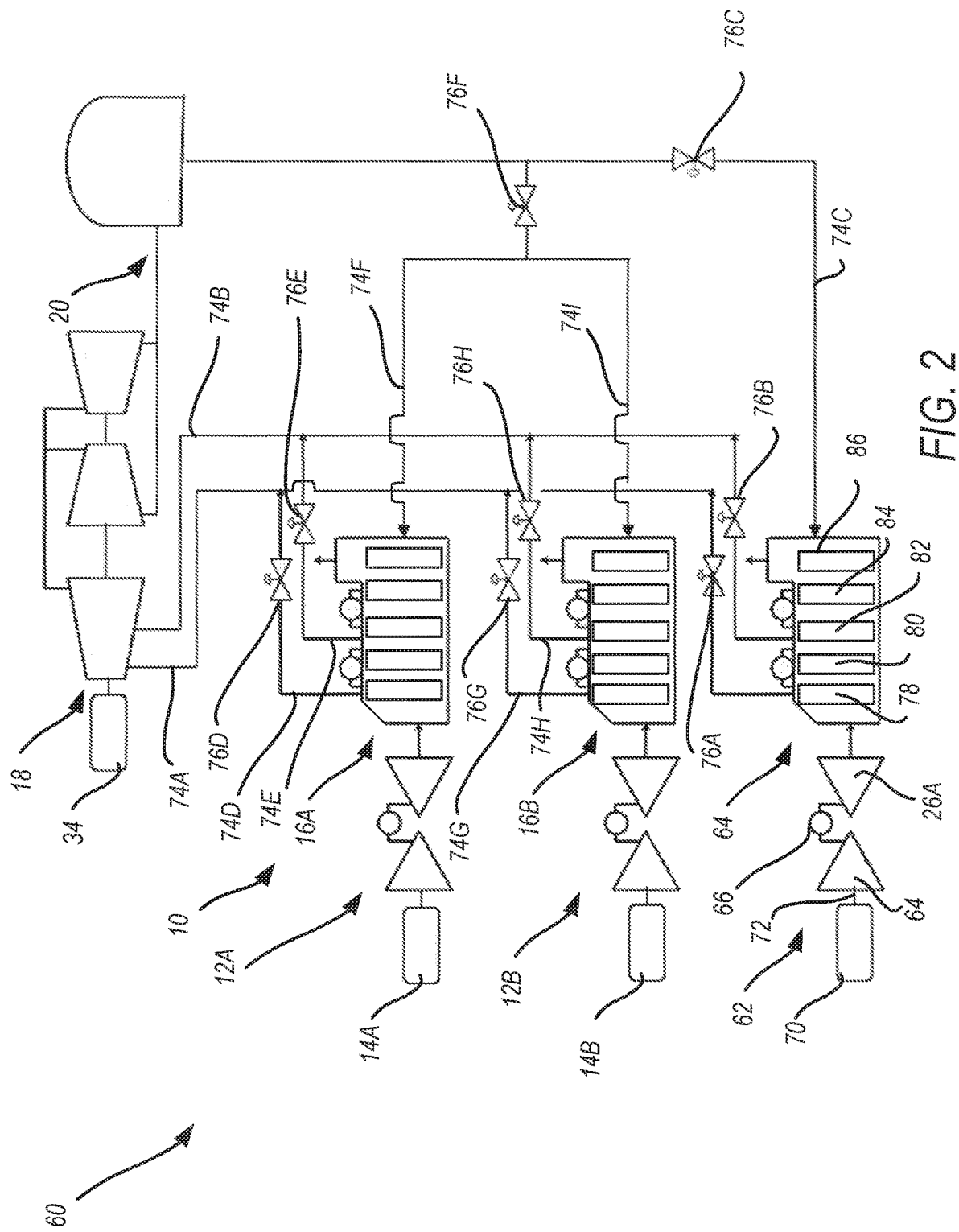
FIG. 2 is a schematic diagram of a combined cycle power plant of the present disclosure, utilizing the conventional power plant of FIG. 1 as a legacy system for operation with an upgraded gas turbine engine and heat recovery steam generator, configured for OverPower operations.

FIG. 2 is a schematic diagram of combined cycle power plant 60 of the present disclosure utilizing power plant 10 of FIG. 1 as a legacy system for operation with upgraded gas turbine engine 62 and heat recovery steam generator 64 configured for overpowering operations. Gas turbine engine (GTE) 62 can comprise compressor 64, combustor 66 and turbine 68. GTE 62 can be coupled to electric generator 70 via shaft 72. Components of power plant 10 of FIG. 1 are the same, with some of the numbering being omitted from FIG. 2 for clarity.

HRSG 64 can be coupled to steam system 18 via outlet lines 74A and 74B and condenser 20 via inlet line 74C. HRSG 16A can be coupled to steam system 18 via outlet lines 74D and 74E and condenser 20 via inlet line 74F. HRSG 16B can be coupled to steam system 18 via outlet lines 74G and 74H and condenser 20 via inlet line 74I.

HRSG 64 can be fluidly coupled and uncoupled to steam system 18 and condenser 20 via valves 76A, 76B and 76C. HRSG 16A can be fluidly coupled and uncoupled to steam system 18 and condenser 20 via valves 76D, 76E and 76F. HRSG 16B can be fluidly coupled and uncoupled to steam system 18 and condenser 20 via valves 76G, 76H and 76F.

HRSG 64 can comprise duct burner 78, superheater 80, evaporator 82, economizer 84 and selective catalytic reduction (SCR) system 86. HRSG 64 can be configured to produce steam flows and flow conditions compatible with steam system 18 and condenser 20. As such, construction of GTE 62 and HRSG 64 can save on the capital investment and construction of a new steam system and condenser. In an exemplary embodiment, as discussed in greater detail below, steam system 18 and condenser 20 are cable of operating with more steam than exhaust of GTE 62 can accommodate such that steam system 18 and condenser 20 are underutilized. As is described with reference to FIGS. 3 and 4, such excess capacity of steam system 18 and condenser 20 can be recaptured by modification of HRSGs 16A and 16B.

As described above, it is contemplated that GTE 62 may relatively be more efficient than GTEs 12A and 12B. In embodiments, GTEs 12A and 12B can comprise older F-Class Equipment, as are known in the art, while GTE 62 can comprise newer, AGTE equipment, such as J-Class equipment. In an example, GTE 62 and GTEs 12A and 12B can operate at approximately the same exhaust temperatures, which can facilitate operation with steam system 18 and condenser 20.

Typically, existing power plants have a steam system that is sized to accommodate steam production from the exhaust gas of the existing GTEs. Steam system 18 and condenser 20 can be configured, e.g., sized, for operating with peak output of GTEs 12A and 12B. Thus, in an example, GTEs 12A and 12B can each provide 150 Megawatts (MW) of power, while steam system 18 when operating with GTEs 12A and 12B in a 2×1 configuration can provide 175 MW of power. GTE 62 can produce 350 MW alone, while steam system 18 when operating with GTE 62 alone in a 1×1 configuration can provide 136 MW of power. As such, GTE 62 can still provide a net gain of 11 MW relative to operation of steam system 18 with GTEs 12A and 12B, without investing in an all new steam system and condenser. However, steam system 18 is underutilized by 39 MW. Although the present application has been described as changing from a 2×1 to a 1×1 configuration, other changes can be made, such as from 3×1 or 4×1 configurations down to 1×1 or 2×1 configurations, for example.

In a first mode of operation, power plant 60 can be configured to operate with GTEs 12A and 12B idle and in a standby mode (e.g., not operating, but also not shuttered or mothballed such that operation can be readily started with appropriate start-up procedures) so that GTE 62 and steam system 18 operate together, such as by closing valves 74D-76H, and opening valves 74A-74C. The first mode of operation would extend the operating life of GTEs 12A and 12B and provide nearly indefinite backup redundancy for GTE 62.

As described, steam system 18 would be underutilized in such a mode. However, as is discussed with reference to FIGS. 3 and 4, power plant 10 can be modified to introduce additional steam into steam system 18 to utilize the 39 MW of excess capacity of steam system 18 that is not being used, such as for operation in peaking mode.

In a second mode of operation, valves 74D-74H could be opened, and valves 74A-74C could be closed so that HRSGs 16A and 16B are connected to steam system 18 and HRSG 64 is taken out of communication with steam system 18. The second mode of operation can be used when GTE 62 is off-line, such as for maintenance. Furthermore, in embodiments where GTEs 12A and 12B are dual-fuel capable, such as with natural gas and liquid fuel, this would allow power plant 60 to maintain dual-fuel capability, with introduction of a gas (only) fueled GTE 62. This would reduce the complexity and cost of GTE 62. Dual-fuel capabilities are typically only used in certain situations, such as emergency situations when natural gas may be unavailable, and thus dual-fuel capabilities for GTE 62 would not be needed if GTEs 12A and 12B can provide liquid fuel operation capabilities for such limited emergency operations. Under various conditions, only one of GTEs 12A and 12B can be operated in the second mode of operation.

In another mode of operation, all of valves 76A-76H could be opened to allow for operation of GTE 62 and GTEs 12A and 12B. This could be considered in situations where the overall capacity is valued greater than the efficiency and/or redundancy. However, in order to prevent operation of all of GTEs 12A, 12B and 62 potentially overwhelming steam system 18 and emissions control units located therein, such as SCR systems 46A, 46B and 86, suitable precautionary measures should be taken such as operating one or more GTEs at partial load to maintain steam pressures, temperatures and flows within the operating limitations of steam system 18, or adding a bypass to the condenser. Additionally, a steam turbine upgrade may be applied to increase an inlet area of the steam turbine to accommodate higher flow rates.

In other embodiments, exhaust gas of GTE 62 could be split between HRSGs 16A and 16B and HRSG 64 could be omitted.

Reuse of legacy combined cycle power plant 10 can permit power plant 60 to continue to operate under various conditions. For example, power plant 60 can keep operating at a high dispatch because of the increased efficiency and provide back up for planned and unplanned outages of GTE 62. Other benefits can include reduction of capital costs by maintaining the existing bottoming cycle (Steam Turbine) equipment. Also, power plant 10 can continue to generate electricity for much of the advanced class GT/HRSG construction, but shutdowns might be appropriate for electrical, steam, water and fuel interconnections. If the existing plant, e.g., power plant 10, is configured for dual-fuel operation, GTE 62 could be supplied or constructed as a single-fuel unit with continued use of the existing units, e.g., GTEs 12A and 12B, for emergency operation. Maintenance costs of the existing units, e.g., GTEs 12A and 12B, could be minimized by installing low cost brown parts or parts near end-of-life, since operating hours of GTEs 12A and 12B, relative to GTE 62, would be very low. Additionally, in constructing GTE 62 and HRSG 64, steam turbine flow paths, e.g., lines 74A-74I, could be upgraded with the installation of GTE 62 and HRSG 64 to further improve cycle efficiencies. For example steam turbine inlet valves and/or stationary and rotating components may be modified to increase the flow areas of the steam turbine and prevent an increase in steam supply pressure resulting from increased flow to the turbine. Such upgrade(s) may help to avoid larger capital expenditure to upgrade plant components (HRSG, Steam Piping, Steam Turbine Casings, etc) within the steam cycle.

As mentioned, HRSGs 16A and 16B can be modified for peaking operation to recapture lost capacity of existing steam system 18 and condenser 20, rather than being preserved in their existing state for back-up or overpowering purposes.

Figure 3:
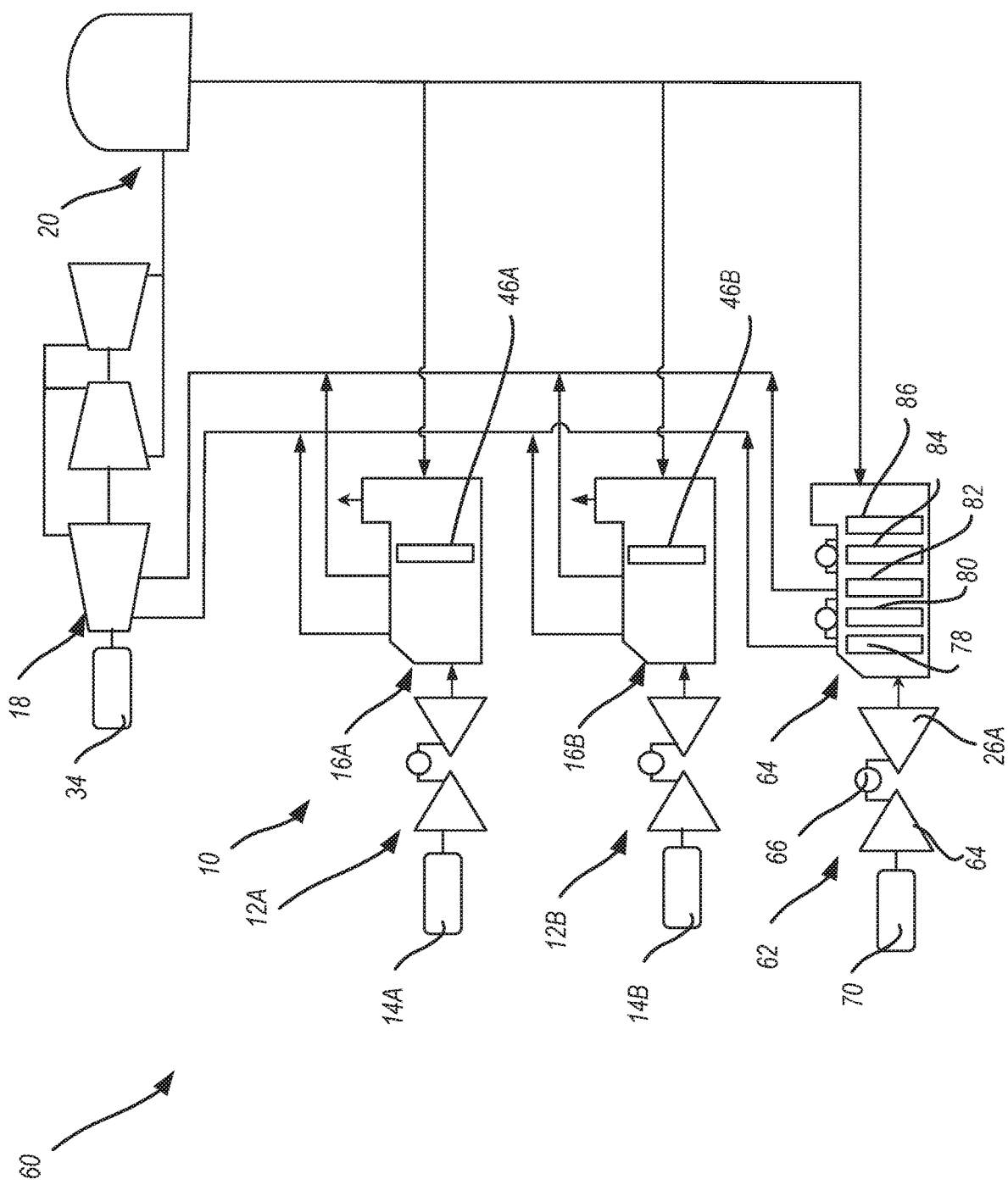
FIG. 3 is a schematic diagram of the combined cycle power plant of FIG. 2 wherein the legacy system is modified for peaking power operations for OverPower.

FIG. 3 is a schematic diagram of combined cycle power plant 60 of FIG. 2 wherein legacy power plant system 10 is modified for peaking power operations. In particular, HRSGs 16A and 16B can be modified for peaking operation of GTEs 12A and 12B, rather than being as originally configured for use in backup or overpowering generation. Modification of HRSGs 16A and 16B can include removal or adaptation of internal components, such as duct burner 38A, superheater 40A, evaporator 42A, economizer 44A, SCR system 46A and any other components such as heat exchangers, so that, for example, the main facility or housing of HRSGs 16A and 16B can be used, such as for a duct for directing exhaust gas from GTEs 12A and 12B. In some configurations modified HRSGs 16A and 16B can include the addition of new components to the main housing or facility. For example, FIG. 3 show HRSGs 16A and 16B to be modified such that duct burners 38A and 38B, superheaters 40A and 40B, evaporators 42A and 42B and economizers 44A and 44B are removed, while SCR systems 46A and 46B are retained.

Figure 6:
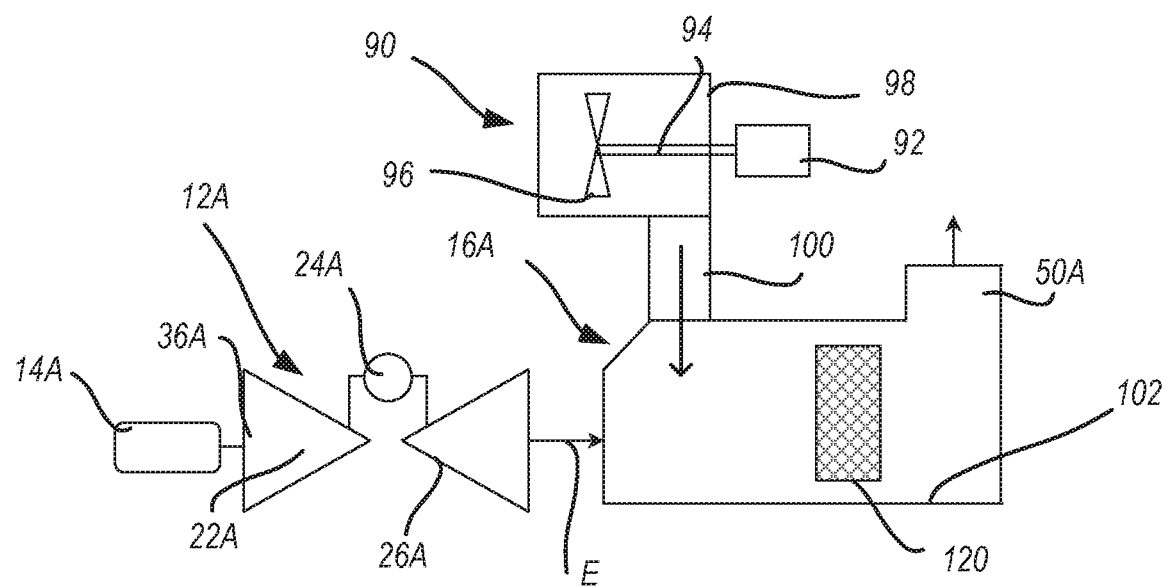
FIG. 6 is a schematic diagram of a third embodiment of a modified legacy system wherein a heat recovery steam generator has been retrofitted with a dilution fan and internal components have been removed and replaced with a high temperature Selective Catalytic Reduction unit for OverPower.
Figure 7:
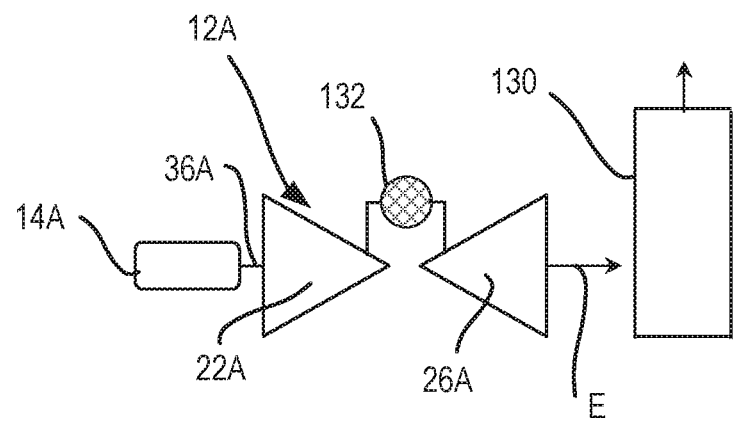
FIG. 7 is a schematic diagram of a fourth embodiment of a modified legacy system wherein a heat recovery steam generator has been removed except for or replaced with an exhaust stack for OverPower.

In general, considerations for peaking operation of GTEs 12A and 12B and HRSGs 16A and 16B can include installation of a once-through steam generator (FIG. 4), a dilution fan (FIG. 5), NOx control using High Temperature Selective Catalytic Reduction (HTSCR) systems (FIG. 6) or Ultra-Low Oxides of Nitrogen (NOx) (ULN) combustors (FIG. 7). Additionally, a starting motor for GTEs 12A and 12B can be upgraded to Start Fast Capability (SFC) to support 10-minute start capability, and engine clearances within GTEs 12A and 12B can be adjusted for fast start. Such modifications can facilitate use of the full capacity of steam system 18 and condenser 20. In various examples, HRSGs can be modified to include exhaust gas conditioning devices, such as once-through steam generators that can reduce the temperature of exhaust gas for compatibility with emissions control units, emissions control units of differing temperature limits, dilution fans, exhaust stacks, and the like, some of which are described in FIGS. 4 through 7. Additionally, FIGS. 4-7 are described as if each existing or previously-installed HRSG is modified in the same way. However, in various examples, existing or previously-installed HRSGS of a single power plant can be modified in different ways. For example, HRSG 16A can be modified in one of the ways described with reference to FIGS. 4-7, while HRSG 16B can be modified in a different one of the ways described with reference to FIGS. 4-7.

Figure 4:
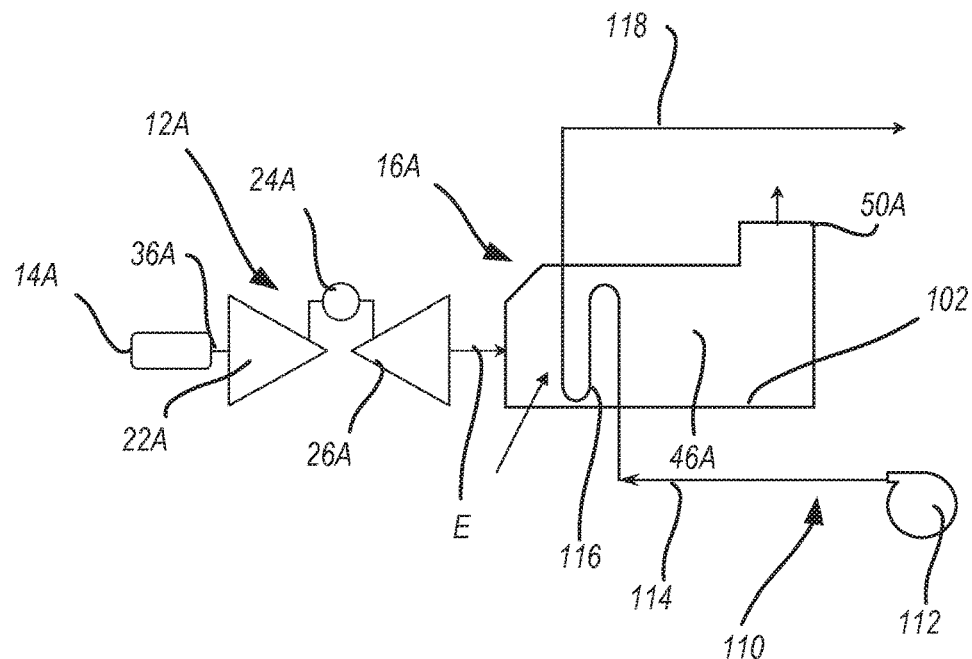
FIG. 4 is a schematic diagram of a first embodiment of a modified legacy system wherein a heat recovery steam generator has been retrofitted with a once-through steam generator and internal components have been removed not including a Selective Catalytic Reduction unit for OverPower.

FIG. 4 is a schematic diagram of a first embodiment of a modified legacy system wherein heat recovery steam generator 16A has been retrofitted with once-through steam generator system 110 and internal components have been removed not including a Selective Catalytic Reduction system 46A. Once-through steam generator system 110 can comprise pump 112, inlet line 114, heat exchange section 116 and outlet line 118. FIG. 4 shows and is described with respect to HRSG 16A, however HRSG 16B can be reconfigured in a like manner.

GTE 12A can be configured to operate in peaking conditions such that electric generator 14A can provide power when the grid system is requiring the most input. Exhaust gas E of GTE 12A can be conditioned or processed to prevent emissions from being uncontrolledly discharged into the atmosphere. In examples, the existing components of HRSG 16A can be used to condition or process exhaust gas E. For example, main housing 102 of HRSG 16A can be used as an exhaust duct. Exhaust gas E can flow from main housing 102 to existing stack 50A and then be discharged to atmosphere. Much of the internal components of HRSG 16A can be removed to, for example, reduce flow losses of exhaust gas E. Additionally, such components can be recycled or reused. For example, duct burner 38A, superheater 40A, evaporator 42A and economizer 44A and any other components such as heat exchangers can be removed. However, SCR system 46A can be left installed within housing 102 to treat exhaust gas E.

HRSG 16A of FIG. 4 can be configured to operate with SCR system 46A operating to treat exhaust gas E to reduce emissions with once-through steam generator system 110 configured to reduce the temperature of exhaust gas E to allow for effective use of SCR system 46A. Other components of original HRSG 16A, such as duct burner 38A, superheater 40A, evaporator 42A and economizer 44A, can be removed. However, in various embodiments, tubing from superheater 40A, evaporator 42A or economizer 44A can be adapted used for heat exchange section 116. Exhaust gas E can be simultaneously cooled by interaction with heat exchange section 116 and used to generate steam from water provided by pump 112 to increase the output of steam system 18 (FIG. 3). Thus, pump 112 can be coupled to a source of water, such as condenser 20 or another source. The water can be pumped through inlet line 114 to heat exchange section 116. The water can be at a temperature lower than that of exhaust gas E. Heat exchange section 116 can be positioned within main housing 102 of HRSG 16A to interact with exhaust gas E. Heat exchange section 116 can comprise any suitable heat exchanger, such a tube or fin-and-plate system. In additional embodiments, heat exchange section 116 can comprise an existing portion of original HRSG 16A that is reconfigured and repurposed to operate as a once-through steam generator heat exchange section. Once the water or steam is heated in heat exchange section 116, it can be routed to outlet line 118 and directed into steam system 18. The steam provided by once-through steam generator system 110 can be used to supplement steam generated by HRSG 64 (FIG. 3) in order to utilize the full capacity of steam system 18. Once-through steam generator system 110 eliminates the thermal mass (and inertia) of a boiler drum and large volume of water. Accordingly, absent this thermal mass (and the time necessary during starting sequences to start producing steam and control water levels within operating limitations), the once-through steam generator system 110 can be used to support quick start operation of power plant 60.

Figure 5:
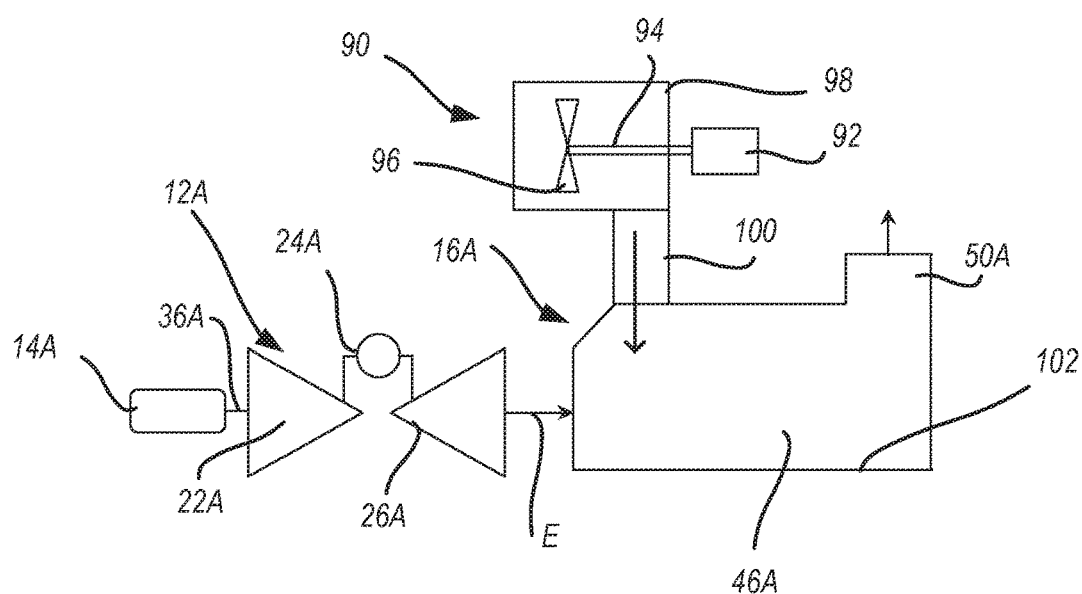
FIG. 5 is a schematic diagram of a second embodiment of a modified legacy system wherein a heat recovery steam generator has been retrofitted with a dilution fan and internal components have been removed not including a Selective Catalytic Reduction unit for OverPower.

FIG. 5 is a schematic diagram of a second embodiment of a modified legacy system wherein a heat recovery steam generator 16A has been retrofitted with dilution fan system 90 and internal components have been removed not including a Selective Catalytic Reduction system 46A. Dilution fan system 90 can include motor 92, shaft 94, fan 96, housing 98 and duct 100. FIG. 5 shows and is described with respect to HRSG 16A, however HRSG 16B can be reconfigured in a like manner.

GTE 12A can be configured to operate in peaking conditions such that electric generator 14A can provide power when the grid system is requiring the most input. Exhaust gas E of GTE 12A can be conditioned or processed to prevent emissions from being uncontrolledly discharged into the atmosphere. In examples, the existing components of HRSG 16A can be used to condition or process exhaust gas E. For example, main housing 102 of HRSG 16A can be used as an exhaust duct. Exhaust gas E can flow from main housing 102 to existing stack 50A and then be discharged to atmosphere. Much of the internal components of HRSG 16A can be removed to, for example, reduce flow losses of exhaust gas E. Additionally, such components can be recycle or reused. For example, duct burner 38A, superheater 40A, evaporator 42A and economizer 44A and any other components such as heat exchangers can be removed. However, SCR system 46A can be left installed within housing 102 to treat exhaust gas E.

Dilution fan system 90 can be mounted to main housing 102 or otherwise coupled to HRSG 16A to quench exhaust gas E. Housing 98 can be positioned around fan 96 and can support shaft 94 and motor 92. Motor 92 can be operated to rotate shaft 94 and fan 98. Fan 98 can comprise any suitably shaped fan blade or airfoil to move air through dilution fan system 90. Air drawn into housing 98 by operation of fan 96 can be pulled through housing 98 and pushed into duct 100 for entry of the air into main housing 102 of HRSG 16A.

Dilution fan system 90 can act to reduce the temperature of exhaust gas E by introducing dilution air that can bring the temperature of exhaust gas E down to a level for effective operation of SCR system 46A. In an example, dilution fan system 90 can cool exhaust gas E to about 600° F. (~316° C.) for proper operation of SCR system 46A. In the embodiment of FIG. 5, there is no tie or interconnection with steam system 18 and exhaust gas E can be diluted, cooled, treated by SCR system 46A and sent out stack 50A.

FIG. 6 is a schematic diagram of a third embodiment of a modified legacy system wherein heat recovery steam generator 16A has been retrofitted with dilution fan system 90 and internal components have been removed and replaced with High Temperature Selective Catalytic Reduction (HTSCR) system 120. In such configurations, HTSCR inlet temperatures should be below approximately 900° F. (~482° C.) to limit overheating of catalyst components contained therein. Dilution fan system 90 can comprise motor 92, shaft 94, fan 96, housing 98 and duct 100. FIG. 6 shows and is described with respect to HRSG 16A, however HRSG 16B can be reconfigured in a like manner.

HRSG 16A and dilution fan system 90 can be configured as described with reference to FIG. 5. However, in the embodiment of FIG. 6, SCR system 46B is replaced with HTSCR system 120. HTSCR system 120 can be configured to operate in temperatures above those of SCR system 46B. In an example, HTSCR system 120 can operate in temperatures of about 900° F. (~482° C.) in order to perform emissions reducing functions. Thus, if exhaust temperatures come close to or exceed such a temperature limit, dilution fan system 90 can be used to reduce the temperature of exhaust gas E to temperatures compatible with HTSCR system 120. Operation of HRSG 16A with HTSCR system 120 can eliminate the need for dilution fan system 90 in various embodiments. As with the embodiment of FIG. 5, there can be no tie-in or interconnection with steam system 18 (FIG. 3) and exhaust gas E can be treated by HTSCR system 120 and sent out stack 50A.

FIG. 7 is a schematic diagram of a fourth embodiment of a modified legacy system wherein heat recovery steam generator 16A has been removed except for stack 50A or replaced with new exhaust stack 130. Exhaust stack 130 can be configured to receive exhaust gas E from GTE 12A. Additionally, combustor 24A can be replaced with an Ultra Low Nox (ULN) combustor 132. FIG. 7 shows and is described with respect to HRSG 16A, however HRSG 16B can be reconfigured in a like manner. ULN combustor 132 can operate to reduce emissions in exhaust gas E as exhaust gas E is being generated by GTE 12A. As such, GTE 12A can operate as a simple cycle engine within previously permitted emissions levels without the need for any further conditioning or treating of exhaust gas E, such as with SCR system 46A or HTSCR system 120, such that exhaust gas E can be sent straight out exhaust stack 130.

In other embodiments, an ULN combustor can be incorporated into GTE 12A along with HRSG 16A of FIG. 4 and SCR system 46A can be removed, in order to facilitate operation with steam system 18.

Figure 8:
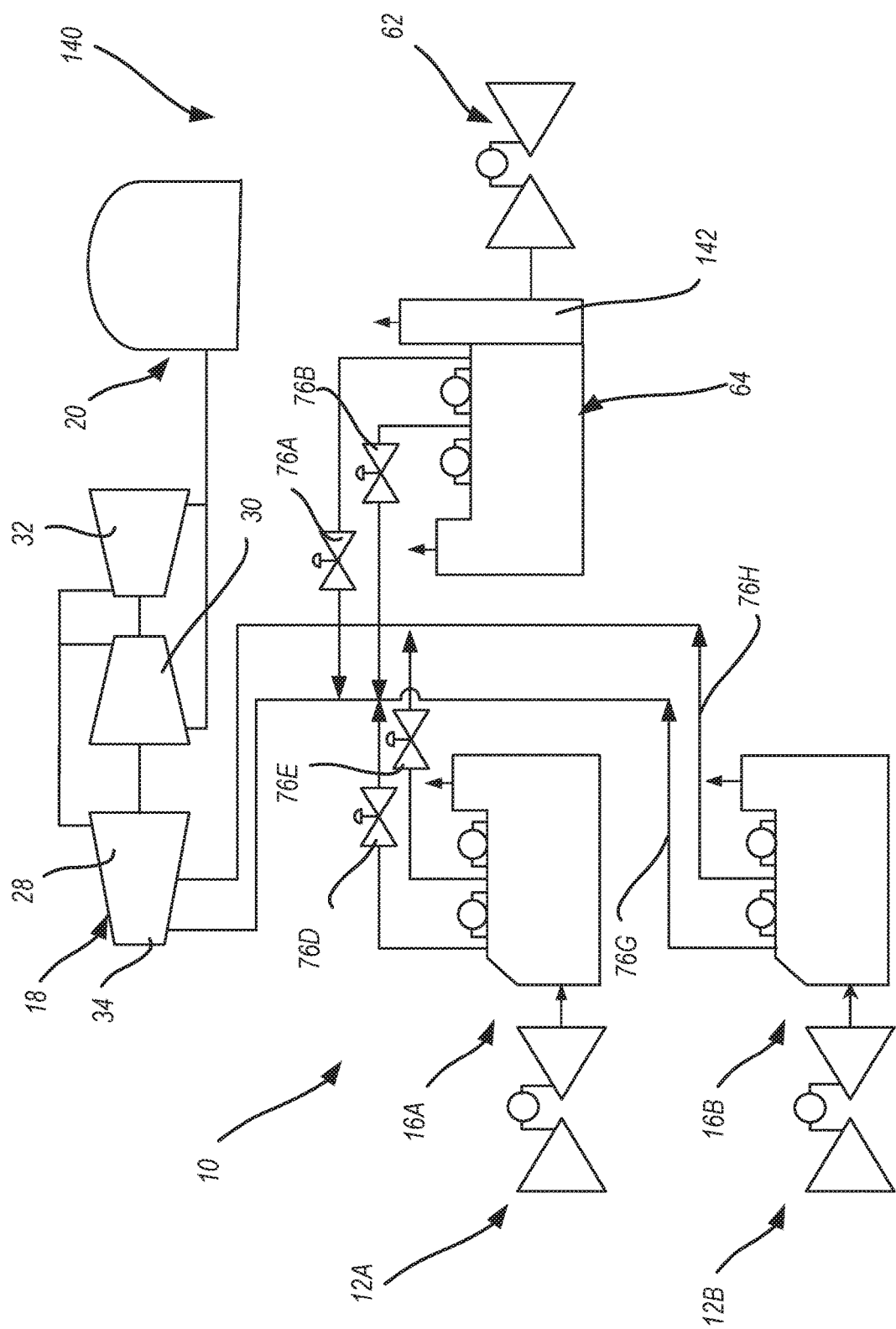
FIG. 8 is a schematic diagram of a combined cycle power plant of the present disclosure, utilizing the conventional power plant of FIG. 1 as a legacy system for operation with an upgraded gas turbine engine and heat recovery steam generator, configured for peaking operation with a bypass stack for OverPower.

FIG. 8 is a schematic diagram of combined cycle power plant 140 of the present disclosure utilizing conventional power plant 10 of FIG. 1 as a legacy system for operation with upgraded gas turbine engine 62 and heat recovery steam generator 64 configured for peaking operation with a bypass stack 142. Power plant 140 can operate in a similar manner as power plant 60 of FIG. 2, except with the additional functionality provided by bypass stack 142. Components of power plant 60 of FIG. 2 are the same, with some of the numbering being omitted from FIG. 8 for clarity. Additionally, lines 74C, 74F and 74I, and valves 76C, and 76F are omitted, but can be included.

Power plant 140 can be configured to run either GTE 62 or GTEs 12A and 12B in combined cycle with steam system 18. For example, for operational periods during which efficiency may be prioritized over capacity, GTE 62 can run in combined cycle, resulting in an under-utilized steam system 18, as described above. However, during peak power periods, when capacity may be prioritized over efficiency, GTEs 12A and 12B can run in combined cycle to fully utilize the capacity of steam system 18, while GTE 62 can run in simple cycle, utilizing bypass stack 142, and follow the grid demand above the combined cycle capacity generated by GTEs 12A and 12B. Also, during maintenance outages of GTE 62, GTEs 12A and 12B can additionally be operated in combined cycle to keep power plant 140 operating. Additionally, for non-attainment regions, or for increased operating hours consideration, a High Temperature Selective Catalytic Reduction system, such as HTSCR system 120, can be used in HRSG 64 and/or ULN combustor 132 can be added to GTE 62.

Power plant 140 can be configured to direct exhaust gas flow from GTE 62 out stack 142 while inhibiting flow of exhaust gas into HRSG 64. As such, bypass stack 140 can include ducting, dampers, louvers, actuators and the like, as is known in the art, to control flow between GTE 62 and HRSG 64. Power plant 140 can additionally include valves and piping between HRSGs 16A, 16B and 64 to allow for sparging to help heat up HRSGs of a non-running unit.

Figure 9:
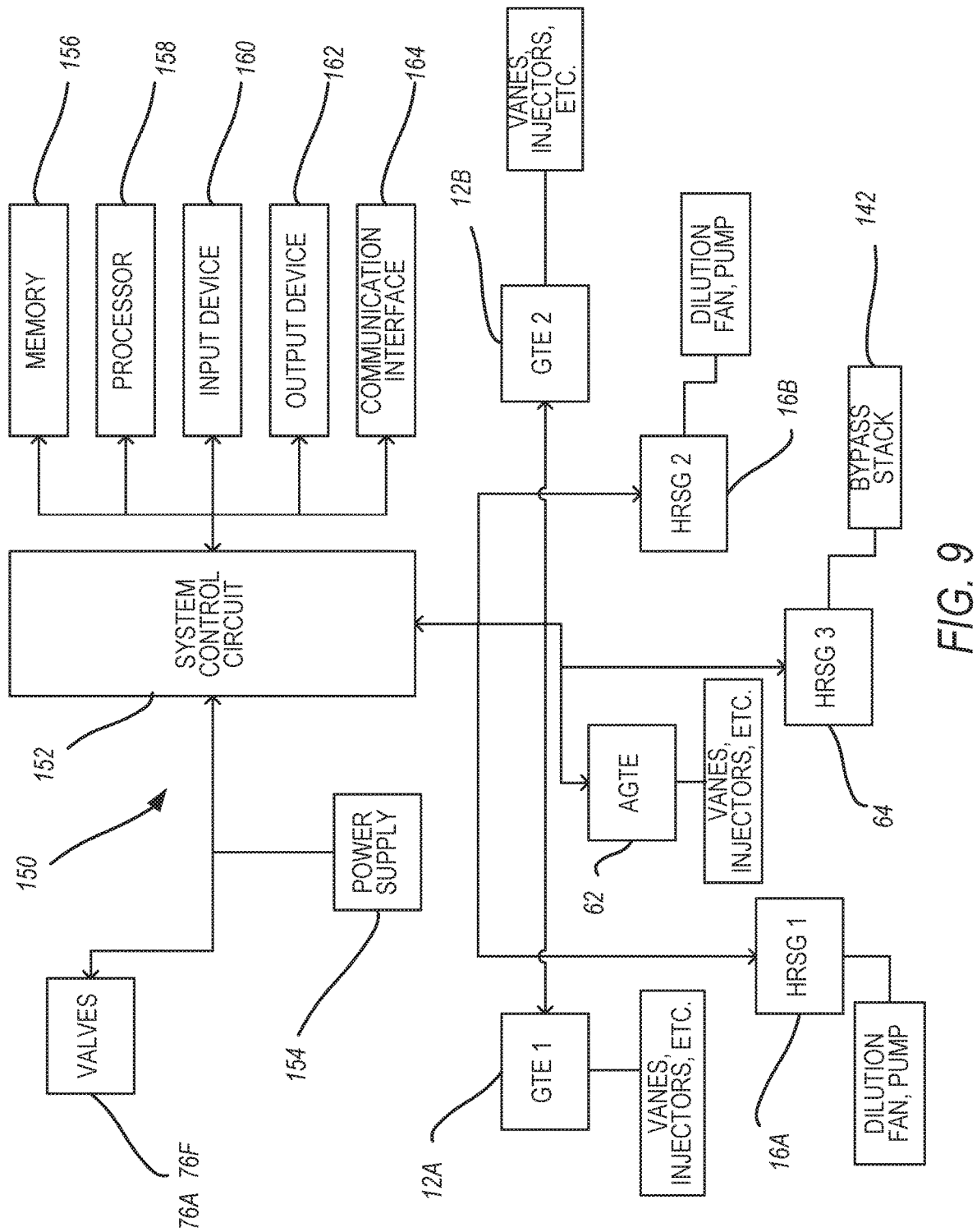
FIG. 9 is a schematic diagram illustrating components of a controller for operating combined cycle power plants of the present disclosure.

FIG. 9 is a schematic diagram illustrating components of controller 150 for operating power plants 60 and 140 of the present application. Controller 150 can include circuit 152, power supply 154, memory 156, processor 158, input device 160, output device 162 and communication interface 164. Controller 150 can be in communication with GTEs 12A and 12B, GTE 62, HRSGs 16A and 16B, and HRSG 64. Controller 150 can be configured to coordinate operation of GTEs 12A, 12B and 62 and HRSGs 16A, 16B and 64, and steam system 18 and condenser 20.

GTEs 12A, 12B and GTE 62 can each include an engine controller to control operation of each gas turbine engine. For example, the engine controllers can be configured to control the combustion process in combustors 24A, 24B and 66A, which can alter the power output of the gas turbines to influence the speed of shafts 36A, 36B and 72 and the flow of exhaust gas E to HRSGs 16A, 16B and 64. To that end, the engine controllers can be configured to operate one or more fuel injectors, variable vanes, and exhaust gas valves for GTEs 12A, 12B and 62. Controller 150 and the engine controllers can also include various computer system components that facilitate receiving and issuing electronic instructions, storing instructions, data and information, communicating with other devices, display devices, input devices, output devices and the like.

Similarly, HRSGs 16A, 16B and 64 can include a controller operated by controller 150 or can directly be operated by controller 150 to, for example, operate various components such as once-through steam generator system 110, dilution fan system 90, bypass stack 142 and the like.

Circuit 152 can comprise any suitable computer architecture such as microprocessors, chips and the like that allow memory 156, processor 158, input device 160, output device 162 and communication interface 164 to operate together. Power supply 154 can comprise any suitable method for providing electrical power to controller 150, such as AC or DC power supplies. Memory 156 can comprise any suitable memory devices, such as random access memory, read only memory, flash memory, magnetic memory and optical memory. Input device 160 can comprise a keyboard, mouse, pointer, touchscreen and other suitable devices for providing a user input or other input to circuit 152 or memory 156. Output device 162 can comprise a display monitor, a viewing screen, a touch screen, a printer, a projector, an audio speaker and the like. Communication interface 164 can comprise devices for allowing circuit 152 to receive information from and transmit information to other computing devices, such as a modem, a router, an I/O interface, a bus, a local area network, a wide area network, the internet and the like.

Circuit 152 can communicate with, that is, read from and write to, a memory device such as memory 156. Memory 156 can include various computer readable instructions for implementing operation of power plants 60 and 140. Thus, memory 156 can include instructions for monitoring demand on and power being supplied to a grid, as well as instructions for the operation of GTEs 12A, 12B and 62 and HRSGs 16A, 16B and 64. Circuit 152 can be connected to various sensors to perform such functions. Memory 156 can also include information that can assist controller 150 in providing instruction to controllers for GTEs 12A, 12B and 62 and HRSGs 16A, 16B and 64. For example, memory 156 can include the type, size (capacity), age, maintenance history, location, of GTEs 12A, 12B and 62 and HRSGs 16A, 16B and 64. As such, circuit 152 can read instructions from memory 156 for deciding when to operate valves 76A-76H and controlling when each of GTEs 12A, 12B and 62, HRSGs 16A, 16B and 64, once-through steam generator system 110, dilution fan system 90 and the like can be operated based on, for example, dispatch instructions from power grid operators or government agencies.

The systems and methods discussed in the present application can be useful in recuperating the value of previously installed or legacy power plant equipment, such as gas turbine engines and heat recovery steam generators. Instead of simply removing such equipment for replacement with newer, more efficient equipment, such equipment can be integrated into a larger system for use with the newer, more efficient equipment. In an embodiment, the previously installed or legacy equipment and the newer, more efficient equipment can be configured for alternate use with a previously installed or legacy steam system. As such, the previously installed legacy equipment can be retained for emergency or alternative fuel situations. In another embodiment, the newer, more efficient equipment can be installed with a heat recovery steam generator bypass stack to facilitate operation of the newer, more efficient equipment in simple cycle or peaking operation while the previously installed or legacy equipment operates in combined cycle with the previously installed or legacy steam system. In another embodiment, the previously installed or legacy equipment can be configured to operate as peaking machines to supplement output of the newer, more efficient equipment. As such, the previously installed legacy equipment can be modified to provide simple cycle, once-through steam cycle or emission-controlled operations to supplement output of the newer, more efficient equipment and, in some embodiments, provide additional steam output for the previously installed or legacy steam system.

While embodiments of the disclosure have been described as incorporating a J-class AGTE into a power plant utilizing one or more legacy F-class GTEs, it will be appreciated that the scope of the disclosure is not so limited, and may also apply to any addition of a GTE having greater capacity and/or efficiency, such as to incorporate a F-class GTE into a power plant that utilizes one or more legacy E-class GTEs, for example.

VARIOUS NOTES & EXAMPLES

Example 1 can include or use subject matter such as a method of operating a power plant that can comprise operating a higher efficiency or higher output gas turbine engine to drive an electrical generator for generating electrical power, generating steam with exhaust gas of the higher efficiency gas turbine engine using a heat recovery steam generator, driving a steam turbine with steam from the heat recovery steam generator, wherein the steam turbine has a capacity greater than an output of steam generated by the heat recovery steam generator as driven by the higher efficiency gas turbine engine, driving a steam electric generator from the steam turbine, in response to a sum of output from the steam electric generator and the electrical generator being less than an electrical demand from a grid, selectively operating one or more lower efficiency, or power, gas turbine engines to drive one or more electrical generators for generating electrical power, the lower efficiency gas turbine engines being less efficient than the higher efficiency gas turbine, and conditioning exhaust gas of the one or more lower efficiency gas turbine engines using one or more modified heat recovery steam generators.

Example 2 can include, or can optionally be combined with the subject matter of Example 1, to optionally include one or more modified heat recovery steam generators that can comprise a previously-installed heat recovery steam generator housing from which at least some previously-installed components are removed.

Example 3 can include, or can optionally be combined with the subject matter of one or any combination of Examples 1 or 2 to optionally include generating steam with exhaust gas of the one or more lower efficiency gas turbine engines, and additionally driving the steam turbine with steam generated from the one or more heat recovery steam generators as driven by the one or more lower efficiency gas turbine engines.

Example 4 can include, or can optionally be combined with the subject matter of one or any combination of Examples 1 through 3 to optionally include generating steam with exhaust gas of the one or more lower efficiency gas turbine engines by operating a once-through steam generator positioned within the previously-installed heat recovery steam generator housing.

Example 5 can include, or can optionally be combined with the subject matter of one or any combination of Examples 1 through 4 to optionally include conditioning exhaust gas of the one or more lower efficiency gas turbine engines using one or more modified heat recovery steam generators by operating a dilution fan to quench exhaust gas entering an emissions reduction system within the one or more modified heat recovery steam generators.

Example 6 can include, or can optionally be combined with the subject matter of one or any combination of Examples 1 through 5 to optionally include an emission reduction system that can comprise a previously-installed emissions reduction system of the one or more modified heat recovery steam generators.

Example 7 can include, or can optionally be combined with the subject matter of one or any combination of Examples 1 through 6 to optionally include an emission reduction system that can comprise a high temperature selective catalytic reduction system.

Example 8 can include, or can optionally be combined with the subject matter of one or any combination of Examples 1 through 7 to optionally include conditioning exhaust gas of the one or more lower efficiency gas turbine engines using one or more modified heat recovery steam generators by routing the exhaust gas through a previously-installed stack of the one or more modified heat recovery steam generators.

Example 9 can include, or can optionally be combined with the subject matter of one or any combination of Examples 1 through 8 to optionally include modifying the one or more lower efficiency gas turbine engines to include an ultra-low NOx combustor.

Example 10 can include or use subject matter such as a power plant system that can comprise a first gas turbine having a first efficiency, or power, configured to produce a first exhaust gas flow, a first electrical generator driven by the first gas turbine, a first heat recovery steam generator configured to receive the first exhaust gas flow and generate a first steam flow, a second gas turbine having a second efficiency, or power, less than the first efficiency, the second gas turbine configured to produce a second exhaust gas flow, a second electrical generator driven by the second gas turbine, an exhaust gas conditioning device configured to reduce the temperature of the second exhaust gas flow, a steam turbine driving a steam electrical generator, the steam turbine configured to receive the first steam flow, and a controller comprising a processor, and a computer readable storage medium having stored thereon instructions that when executed by the processor cause the processor to perform an operation for operating the power plant system, the instructions comprising in response to a sum of output from the steam electrical generator and the first electrical generator being less than an electrical demand from a grid, operating the second gas turbine to generate electricity with the second electrical generator under peak loading conditions.

Example 11 can include, or can optionally be combined with the subject matter of Example 10, to optionally include a modified heat recovery steam generator that can be configured to operate in conjunction with the second gas turbine, the modified heat recovery steam generator including the exhaust gas conditioning device.

Example 12 can include, or can optionally be combined with the subject matter of one or any combination of Examples 10 or 11 to optionally include a modified heat recovery steam generator comprising a housing of a previously-installed heat recovery steam generator.

Example 13 can include, or can optionally be combined with the subject matter of one or any combination of Examples 10 through 12 to optionally include an exhaust gas conditioning device that can comprise a steam generator.

Example 14 can include, or can optionally be combined with the subject matter of one or any combination of Examples 10 through 13 to optionally include a steam generator that can comprise a once-through steam generator loop installed within the housing of the previously-installed heat recovery steam generator, the once-through steam generator loop generating a second steam flow, and the steam turbine receives the first steam flow and the second steam flow.

Example 15 can include, or can optionally be combined with the subject matter of one or any combination of Examples 10 through 14 to optionally include an exhaust gas conditioning device that can comprise a dilution fan configured to quench exhaust gas within the housing of the previously-installed heat recovery steam generator.

Example 16 can include, or can optionally be combined with the subject matter of one or any combination of Examples 10 through 15 to optionally include a housing of the previously-installed heat recovery steam generator that includes a previously-installed emissions reduction system of the modified heat recovery steam generator.

Example 17 can include, or can optionally be combined with the subject matter of one or any combination of Examples 10 through 16 to optionally include a housing of the previously-installed heat recovery steam generator including a high temperature selective catalytic reduction system.

Example 18 can include, or can optionally be combined with the subject matter of one or any combination of Examples 10 through 17 to optionally include an exhaust gas conditioning device comprises a previously-installed stack of the modified heat recovery steam generator.

Example 19 can include, or can optionally be combined with the subject matter of one or any combination of Examples 10 through 18 to optionally include a second gas turbine that is modified to include an ultra-low NOx combustor.

Example 20 can include or use subject matter such as a method of upgrading a power plant including a first gas turbine, a first heat recovery steam generator and a steam turbine located at a facility wherein the method can comprise installing at the facility a second gas turbine having an efficiency, or power, greater than that of the first gas turbine, installing at the facility a second heat recovery steam generator to receive exhaust gas from the second gas turbine, coupling the second heat recovery steam generator to the steam turbine, and modifying the first heat recovery steam generator to condition exhaust gas from the first gas turbine.

Example 21 can include, or can optionally be combined with the subject matter of Example 20, to optionally include comprising coupling the modified first heat recovery steam generator to the steam turbine.

Example 22 can include, or can optionally be combined with the subject matter of one or any combination of Examples 20 or 21 to optionally include modifying the first heat recovery steam generator by removing steam generating components of the first heat recovery steam generator.

Example 23 can include, or can optionally be combined with the subject matter of one or any combination of Examples 20 through 22 to optionally include modifying the first heat recovery steam generator by decoupling the first heat recovery steam generator from the steam turbine.

Example 24 can include, or can optionally be combined with the subject matter of one or any combination of Examples 20 through 23 to optionally include modifying the first heat recovery steam generator comprises leaving installed an emissions reduction system of the first heat recovery steam generator.

Example 25 can include, or can optionally be combined with the subject matter of one or any combination of Examples 20 through 24 to optionally include modifying the first heat recovery steam generator by installing a high temperature selective catalytic reduction system in the first heat recovery steam generator, the high temperature selective catalytic reduction system capable of effectively reducing emissions in exhaust gas at a temperature higher at which a previously-installed selective catalytic reduction system of the first heat recovery steam generator can effectively reduce emissions.

Example 26 can include, or can optionally be combined with the subject matter of one or any combination of Examples 20 through 25 to optionally include modifying the first heat recovery steam generator by installing a once-through steam generator in the first heat recovery steam generator.

Example 27 can include, or can optionally be combined with the subject matter of one or any combination of Examples 20 through 26 to optionally include modifying the first heat recovery steam generator by installing a dilution fan on the first heat recovery steam generator.

Example 28 can include, or can optionally be combined with the subject matter of one or any combination of Examples 20 through 27 to optionally include modifying the first heat recovery steam generator by removing components of the first heat recovery steam generator to leave a stack.

Example 29 can include, or can optionally be combined with the subject matter of one or any combination of Examples 20 through 28 to optionally include installing an ultra-low NOx combustor in the first gas turbine, the ultra-low NOx combustor configured to generate lower emissions than a previously-installed combustor of the first gas turbine.

Example 30 can include or use subject matter such as a method of operating a power plant that can comprise operating a higher efficiency or higher output gas turbine engine to drive an electrical generator for generating electrical power, generating steam with exhaust gas of the higher efficiency gas turbine using a heat recovery steam generator, driving a steam turbine with steam from the heat recovery steam generator, wherein the steam turbine has a capacity greater than an output of steam generated by the heat recovery steam generator as driven by the higher efficiency gas turbine, operating one or more lower efficiency, or output, gas turbine engines to drive one or more electrical generators for generating electrical power, generating steam with exhaust gas of the one or more lower efficiency gas turbines using one or more heat recovery steam generators, driving the steam turbine with steam from the one or more heat recovery steam generators, wherein the steam turbine has a capacity approximately equivalent to an output of steam generated by the one or more heat recovery steam generators as driven by the one or more lower efficiency gas turbines and the output of steam generated by the one or more heat recovery steam generators driven by the one or more lower efficiency gas turbines is greater than the output of steam generated by the heat recovery steam generator as driven by the higher efficiency gas turbine, alternately operating the higher efficiency gas turbine and the one or more lower efficiency gas turbines to drive the steam turbine.

Example 31 can include or use subject matter such as a power plant system that can comprise a first gas turbine having a first efficiency, or output, configured to produce a first exhaust gas flow, a first electrical generator driven by the first gas turbine, a first heat recovery steam generator configured to receive the first exhaust gas flow and generate a first steam flow, a second gas turbine having a second efficiency, or output, less than the first efficiency, the second gas turbine configured to produce a second exhaust gas flow, a second electrical generator driven by the second gas turbine, a second heat recovery steam generator configured to receive the second exhaust gas flow and generate a second steam flow, a steam turbine configured to receive the first steam flow and the second steam flow, valving controlling flow of the first steam flow and the second steam flow from the first and second heat recovery steam generators to the steam turbine, and a controller comprising a processor, and a computer readable storage medium having stored thereon instructions that when executed by the processor cause the processor to perform an operation for operating the power plant system, the instructions comprising operating the valving to alternately allow the first steam flow or the second steam flow to reach the steam turbine, depending on operation of the first gas turbine or the second gas turbine.

Example 32 can include or use subject matter such as a method of operating a power plant that can comprise operating a higher efficiency or higher output gas turbine engine to drive an electrical generator for generating electrical power, generating steam with exhaust gas of the higher efficiency gas turbine using a heat recovery steam generator, driving a steam turbine with steam from the heat recovery steam generator, wherein the steam turbine has a capacity greater than an output of steam generated by the heat recovery steam generator as driven by the higher efficiency gas turbine, selectively operating one or more lower efficiency, or lower output, gas turbine engines to drive one or more electrical generators for generating electrical power, generating steam with exhaust gas of the one or more lower efficiently gas turbine using one or more heat recovery steam generators, and additionally driving the steam turbine with steam from the one or more heat recovery steam generators as driven by the one or more lower efficiency gas turbine engines.

Example 33 can include or use subject matter such as a power plant system that can comprise a first gas turbine having a first efficiency or output, the first gas turbine configured to produce a first exhaust gas flow, a first electrical generator driven by the first gas turbine, a first heat recovery steam generator configured to receive the first exhaust gas flow and generate a first steam flow, a second gas turbine having a second efficiency or output less than the first efficiency, the second gas turbine configured to produce a second exhaust gas flow, a second electrical generator driven by the second gas turbine, an exhaust gas conditioning device configured to reduce the temperature of the second exhaust gas flow, a steam turbine configured to receive the first steam flow, and a controller comprising a processor, and a computer readable storage medium having stored thereon instructions that when executed by the processor cause the processor to perform an operation for operating the power plant system, the instructions comprising selectively operating the second gas turbine to generate electricity with the second electrical generator under peak loading conditions.

Example 34 can include, or can optionally be combined with the subject matter of Example 33, to optionally include the exhaust gas conditioning device comprising a once through steam generator loop installed within a casing of a second heat recovery steam generator, the once through steam generator loop generating a second steam flow, and the steam turbine receiving the first steam flow and the second steam flow.

Example 35 can include or use subject matter such as a method of operating a power plant that can comprise operating a higher efficiency or higher output gas turbine engine to drive an electrical generator for generating electrical power, generating steam with exhaust gas of the higher efficiency gas turbine using a heat recovery steam generator, driving a steam turbine with steam generated from the heat recovery steam generator, wherein the steam turbine has a capacity greater than an output of steam generated by the heat recovery steam generator as driven by the higher efficiency gas turbine, operating one or more lower efficiency or lower output gas turbine engines to drive one or more electrical generators for generating electrical power, and cooling exhaust gas of the one or more lower efficiency gas turbines using one or more modified heat recovery steam generators, the modified heat recovery steam generator including one or more of the following a selective catalytic reduction emissions reduction unit, and a dilution fan.

Example 36 can include, or can optionally be combined with the subject matter of Example 35, to optionally include the modified heat recovery steam generators having had heat exchange apparatus removed therefrom.

Example 37 can include or use subject matter such as a power plant system that can comprise a first gas turbine having a first efficiency or output configured to produce a first exhaust gas flow, a first electrical generator driven by the first gas turbine, a first heat recovery steam generator configured to receive the first exhaust gas flow and generate a first steam flow, a second gas turbine having a second efficiency or output less than the first efficiency, the second gas turbine configured to produce a second exhaust gas flow, a second electrical generator driven by the second gas turbine, a selective catalytic reduction emissions reduction unit configured to receive the second exhaust gas flow, a steam turbine configured to receive the first steam flow, and a controller comprising a processor, and a computer readable storage medium having stored thereon instructions that when executed by the processor cause the processor to perform an operation for operating the power plant system, the instructions comprising selectively operating the second gas turbine to generate electricity with the second electrical generator under peak loading conditions.

Example 38 can include or use subject matter such as a method of operating a power plant that can comprise operating a higher efficiency or higher output gas turbine engine to drive an electrical generator for generating electrical power, generating steam with exhaust gas of the higher efficiency gas turbine using a heat recovery steam generator, driving a steam turbine with steam from the heat recovery steam generator, wherein the steam turbine has a capacity greater than an output of steam by the heat recovery steam generator as driven by the higher efficiency gas turbine, operating one or more lower efficiency or output gas turbine engines to drive one or more electrical generators for generating electrical power, generating steam with exhaust gas of the one or more lower efficiency gas turbines using one or more modified heat recovery steam generators, and providing steam from the one or more modified heat recovery steam generators to the steam turbine to close a gap between the output of the heat recovery steam generator and the capacity of the steam generator.

Example 39 can include or use subject matter such as a power plant system that can comprise a first gas turbine having a first efficiency or output configured to produce a first exhaust gas flow, a first electrical generator driven by the first gas turbine, a first heat recovery steam generator configured to receive the first exhaust gas flow and generate a first steam flow, a second gas turbine having a second efficiency or output less than the first efficiency, the second gas turbine configured to produce a second exhaust gas flow, a second electrical generator driven by the second gas turbine, a once-through steam generator configured to receive the second exhaust gas flow and generate a second steam flow, a steam turbine configured to receive the first steam flow and the second steam flow, and a controller comprising a processor, and a computer readable storage medium having stored thereon instructions that when executed by the processor cause the processor to perform an operation for operating the power plant system, the instructions comprising selectively operating the second gas turbine to generate electricity with the second electrical generator under peak loading conditions and to increase output of the steam turbine.

Example 40 can include, or can optionally be combined with the subject matter of Example 39, to optionally include instructions further comprising sequencing operation of the second gas turbine before the first gas turbine.

Example 41 can include, or can optionally be combined with the subject matter of Example 39 or 40, to optionally include the sequencing operation of the second gas turbine being configured to increase an temperature of the steam turbine to a state of operational readiness.

Example 42 can include or use subject matter such as a method of operating a power plant that can comprise operating a higher efficiency or higher output gas turbine engine to drive an electrical generator for generating electrical power, generating steam with exhaust gas of the higher efficiency gas turbine using a heat recovery steam generator, driving a steam turbine with steam from the heat recovery steam generator, wherein the steam generator has a capacity greater than an output of steam from the heat recovery steam generator as driven by the higher efficiency gas turbine, and selectively operating one or more lower efficiency or lower output gas turbine engines to drive one or more electrical generators for generating electrical power, the lower efficiency gas turbine including an Ultra Low Nox combustor.

Example 43 can include or use subject matter such as a power plant system that can comprise a first gas turbine having a first efficiency or first output configured to produce a first exhaust gas flow, a first electrical generator driven by the first gas turbine, a first heat recovery steam generator configured to receive the first exhaust gas flow and generate a first steam flow, a second gas turbine having a second efficiency or second output less than the first efficiency, the second gas turbine configured to produce a second exhaust gas flow, the second gas turbine comprising an Ultra Low Nox combustor, a second electrical generator driven by the second gas turbine, a steam turbine coupled to a steam electrical generator, the steam turbine configured to receive the first steam flow, and a controller comprising a processor, and a computer readable storage medium having stored thereon instructions that when executed by the processor cause the processor to perform an operation for operating the power plant system, the instructions comprising selectively operating the second gas turbine to generate electricity with the second electrical generator under peak loading conditions greater than a sum of output of the first electrical generator and the steam electrical generator.

Example 44 can include or use subject matter such as a method of upgrading a power plant including a first gas turbine, a first heat recovery steam generator and a steam turbine located at a facility wherein the method can comprise installing at the facility a second gas turbine having an efficiency greater than that of the first gas turbine, installing at the facility a second heat recovery steam generator to receive exhaust gas from the second gas turbine, coupling the second heat recovery steam generator to the steam turbine, and installing valving to alternatively control flow of steam from the first heat recovery steam generator and the second heat recovery steam generator to the steam turbine.

Example 45 can include or use subject matter such as a method of upgrading a power plant including a first gas turbine, a first heat recovery steam generator and a steam turbine located at a facility wherein the method can comprise installing at the facility a second gas turbine having an efficiency greater than that of the first gas turbine, installing at the facility a second heat recovery steam generator to receive exhaust gas from the second gas turbine, coupling the second heat recovery steam generator to the steam turbine, and modifying the first heat recovery steam generator to condition exhaust gas from the first gas turbine.

Example 46 can include, or can optionally be combined with the subject matter of Example 45, to optionally include coupling the modified first heat recovery steam generator to the steam turbine.

Example 47 can include, or can optionally be combined with the subject matter of Example 45 or 46, to optionally include decoupling the modified first heat recovery steam generator from the steam turbine.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A method of operating a power plant, the method comprising:
    operating a higher efficiency gas turbine engine to drive an electrical generator for generating electrical power;
    generating steam with exhaust gas of the higher efficiency gas turbine engine using a heat recovery steam generator;
    driving a steam turbine with steam from the heat recovery steam generator, wherein the steam turbine has a capacity greater than an output of steam generated by the heat recovery steam generator as driven by the higher efficiency gas turbine engine;
    driving a steam electric generator from the steam turbine;
    in response to a sum of output from the steam electric generator and the electrical generator being less than an electrical demand from a grid, selectively operating one or more lower efficiency gas turbine engines to drive one or more electrical generators for generating electrical power, the lower efficiency gas turbine engines being less efficient than the higher efficiency gas turbine; and
    conditioning exhaust gas of the one or more lower efficiency gas turbine engines using one or more modified heat recovery steam generators.

2. The method of claim 1, wherein the one or more modified heat recovery steam generators comprises a previously-installed heat recovery steam generator housing from which at least some previously-installed components are removed.

3. The method of claim 2, further comprising:
    generating steam with exhaust gas of the one or more lower efficiency gas turbine engines; and
    additionally driving the steam turbine with steam generated from the one or more heat recovery steam generators as driven by the one or more lower efficiency gas turbine engines.

4. The method of claim 3, wherein generating steam with exhaust gas of the one or more lower efficiency gas turbine engines comprises operating a once-through steam generator positioned within the previously-installed heat recovery steam generator housing.

5. The method of claim 2, wherein conditioning exhaust gas of the one or more lower efficiency gas turbine engines using one or more modified heat recovery steam generators comprises operating a dilution fan to quench exhaust gas entering an emissions reduction system within the one or more modified heat recovery steam generators.

6. The method of claim 5, wherein the emission reduction system comprises a previously-installed emissions reduction system of the one or more modified heat recovery steam generators.

7. The method of claim 5, wherein the emission reduction system comprises a high temperature selective catalytic reduction system.

8. The method of claim 2, wherein conditioning exhaust gas of the one or more lower efficiency gas turbine engines using one or more modified heat recovery steam generators comprises routing the exhaust gas through a previously-installed stack of the one or more modified heat recovery steam generators.

9. The method of claim 8, further comprising modifying the one or more lower efficiency gas turbine engines to include an ultra-low NOx combustor.

10. A power plant system comprising:
    a first gas turbine having a first efficiency configured to produce a first exhaust gas flow;
    a first electrical generator driven by the first gas turbine;
    a first heat recovery steam generator configured to receive the first exhaust gas flow and generate a first steam flow;
    a second gas turbine having a second efficiency less than the first efficiency, the second gas turbine configured to produce a second exhaust gas flow;
    a second electrical generator driven by the second gas turbine;
    an exhaust gas conditioning device configured to reduce the temperature of the second exhaust gas flow;
    a steam turbine driving a steam electrical generator, the steam turbine configured to receive the first steam flow; and
    a controller comprising:
        a processor; and
        a computer readable storage medium having stored thereon instructions that when executed by the processor cause the processor to perform an operation for operating the power plant system, the instructions comprising:
            in response to a sum of output from the steam electrical generator and the first electrical generator being less than an electrical demand from a grid, operating the second gas turbine to generate electricity with the second electrical generator under peak loading conditions.

11. The power plant system of claim 10, further comprising a modified heat recovery steam generator configured to operate in conjunction with the second gas turbine, the modified heat recovery steam generator including the exhaust gas conditioning device.

12. The power plant system of claim 11, wherein the modified heat recovery steam generator comprises a housing of a previously-installed heat recovery steam generator.

13. The power plant system of claim 12, wherein the exhaust gas conditioning device comprises a steam generator.

14. The power plant system of claim 13, wherein:
the steam generator comprises a once-through steam generator loop installed within the housing of the previously-installed heat recovery steam generator;
the once-through steam generator loop generates a second steam flow; and
the steam turbine receives the first steam flow and the second steam flow.

15. The power plant system of claim 12, wherein the exhaust gas conditioning device comprises a dilution fan configured to quench exhaust gas within the housing of the previously-installed heat recovery steam generator.

16. The power plant system of claim 15, wherein the housing of the previously-installed heat recovery steam generator includes a previously-installed emissions reduction system of the modified heat recovery steam generator.

17. The power plant system of claim 15, wherein the housing of the previously-installed heat recovery steam generator includes a high temperature selective catalytic reduction system.

18. The power plant system of claim 12, wherein the exhaust gas conditioning device comprises a previously-installed stack of the modified heat recovery steam generator.

19. The power plant system of claim 18, the second gas turbine is modified to include an ultra-low NOx combustor.

* * * * *